//  
United States Patent [19]

Strauff

[11] 3,954,149
[45] May 4, 1976

[54] HYDRAULIC PRESSURE FLUID CONTROL SYSTEM FOR CONTROLLING THE DISPLACEMENTS OF A DOUBLE-ACTING SERVO-MOTOR

[75] Inventor: Günther Strauff, Kaarst, Germany

[73] Assignee: Langen & Co., Dusseldorf, Germany

[22] Filed: July 1, 1975

[21] Appl. No.: 592,233

[30] Foreign Application Priority Data

July 27, 1974  Germany............................. 2436315

[52] U.S. Cl................................. 180/148; 91/434; 91/465
[51] Int. Cl.²........................................... B62D 5/08
[58] Field of Search................. 180/79.2 R; 91/434, 91/465, 372, 373

[56] References Cited
UNITED STATES PATENTS 3,917,018  11/1975  Strauff............................ 180/79.2 R
3,922,953  12/1975  Strauff.............................. 91/434 X

*Primary Examiner*—M. H. Wood, Jr.
*Attorney, Agent, or Firm*—Holman & Stern

[57] ABSTRACT

A hydraulic pressure fluid control system for controlling the displacements of a double-acting servo motor wherein a servo assisting valve mechanism comprises in addition to the control pistons for controlling and maintaining the pressures in the working chambers of the servo motor and the coil springs which place a predetermined minimum force to act on the pistons, spring retainers and further coil springs concentric and codirectional with the first coil springs arranged such that upon a movement of the input member of the system, a predetermined threshold force must be met before the input member directly couples with and controls the movements of the control pistons, the biasing of the coil springs and the further coil springs establishing the threshold value.

2 Claims, 2 Drawing Figures

HYDRAULIC PRESSURE FLUID CONTROL SYSTEM FOR CONTROLLING THE DISPLACEMENTS OF A DOUBLE-ACTING SERVO-MOTOR

BACKGROUND OF THE INVENTION

The invention relates to a hydraulic pressure fluid control system for controlling the displacements of a double-acting servo-motor having preferably equal hydraulic cross sections, particularly for servo-assisted steering gear in motor vehicles, comprising a control valve arrangement which in neutral position cuts off the working chambers of the servo-motor from a pressure source and a return and the pressure source from the return, and which contains valve members in the form of two control pistons of which each is associated with one working chamber; actuating means for manually operating the control pistons in dependence upon relative motion between an input member and an output member of the pressure fluid control system, the output member being connected to the working member of the servo-motor, e.g., to its servo-piston, and the movements of the working member being retransmitted to the control valve system by mechanical feedback means; the control piston being provided with reaction faces to which the pressures existing in the working chambers of the servo-motor are applied, so that each working chamber is associated with such a reaction face; there being further provided between each of the control pistons and the actuating member coil springs opposing the thrust of the pressure acting on the reaction faces, said springs causing a predetermined minimum pressure to act on the reaction faces and to be maintained in the working chambers, and the control pistons being so disposed in relation to the input member that starting from the neutral position of the input member the rigid coupling connection between the control piston and the input member is not achieved until a predetermined relative motion has taken place between the input member and the output member which are connected by interposed biased elastically yielding coupling means.

As known, the purpose of such hydraulic pressure fluid control systems is to provide servo-assistance and thereby to reinforce a manually applied input force or torque. If the elastically yielding coupling means between the input member and the output member are biased, this bias creates a response threshold below which the applied force will be transmitted without hydraulic servo-assistance, whereas above the threshold the previously effective transmission of force will be hydraulically reinforced. Below the response threshold the coil springs between the control pistons and the input member allow movements of the control pistons to take place, which result from changes in the pressures acting on the reaction faces due to the mechanically effected displacement of the working member of the servo-motor. They also serve to maintain a predetermined minimum pressure in the working chambers even before the input member has been operated. This minimum pressure has the effect of hydraulically clamping the servo-motor between opposing pressures and of thereby reducing shock loads and jolts while additionally eliminating noise which may otherwise be caused by cavitation or air desorption phenomena.

Such a fluid pressure control system has already been described in the U.S. Pat. application Ser. No. 427,131. The biased elastic coupling means in this instance is an annular spring. The drawback of such an annular spring is that it requires additional space although this may be small, that it is rather expensive, and that it requires carefully matched support and actuating means which are therefore difficult to provide as well as being liable to rapid wear.

OBJECT AND SUMMARY OF THE INVENTION

It is therefore the object of the present invention to contrive a hydraulic pressure fluid control system of the specified kind in such a way that it is of the utmost compactness, requires inexpensive and simple components without any impairment in functional efficiency.

This object is achieved by the present invention which consists in a combination of the following features:

a. Before the input member is operated the coil springs each bear on the one hand on a control piston and on the other hand on the output member through an interposed spring retainer.

b. Each spring retainer is loaded by another biased coil spring which preferably embraces the first coil spring and being supported by the output member, acts codirectionally with the first.

c. Either one of the spring retainers can be lifted by the input member further to compress the coil springs when the thrust of the input member exceeds a response threshold established by the bias of the coil springs.

Preferably the rigid coupling between control piston and input member may be provided by tappets which extend axially through the springs loading the control piston and through the spring retainers. A central symmetrically balanced position of the input member in relation to the spring retainers can be adjusted by centering screws provided in the input member and adapted to bear against the spring retainers. In order to preset the clearance between the tappets and the associated control pistons respectively, and the input member, set screws may be provided and preferably located in the centering screws.

The advantage afforded by the proposed arrangement resides firstly in that the concentric disposition of the coil springs favorably utilizes space. Since when the input member is not operated, the coil springs bearing on the control pistons are supported by spring retainers resting on the output member and not, as previously proposed, on the input member, the thrusts do not offset each other upon operation, and one of the springs is not further compressed until its initial bias has been exceeded by the thrust of the input member. Expressed in other words, the biasing thrusts of each of these springs may be regarded as providing a fraction of the response threshold. The bias of the springs interposed between the spring retainers and the output member can be reduced by this fraction in relation to prior art arrangements in which these springs alone determined the response threshold. Any reduction in precompression means that the springs can be reduced in size and that spaced can be saved. With regard to the manner in which they function there is another advantage which consists in that the minimum pressure will be fully maintained on the side from which the pressure medium is displaced. In earlier forms of construction, the increase in clearance between input member and the control piston controlling the discharge of fluid permitted the associated coil spring to relax with a consequent drop in minimum pressure. In the present arrangement, the relaxation of the coil spring is limited because the spring retainer rests on the output member. The input member can lose contact with the spring retainer and then has no further effect on the associated springs. Other advantages and features of the invention will be understood from the following description and appendant claims.

BRIEF DESCRIPTION OF THE DRAWINGS

The invention will be more particularly described with reference to an embodiment which is illustratively shown in the drawing, in which.

DETAILED DESCRIPTION OF THE PREFERRED EMBODIMENT

Figure 1:
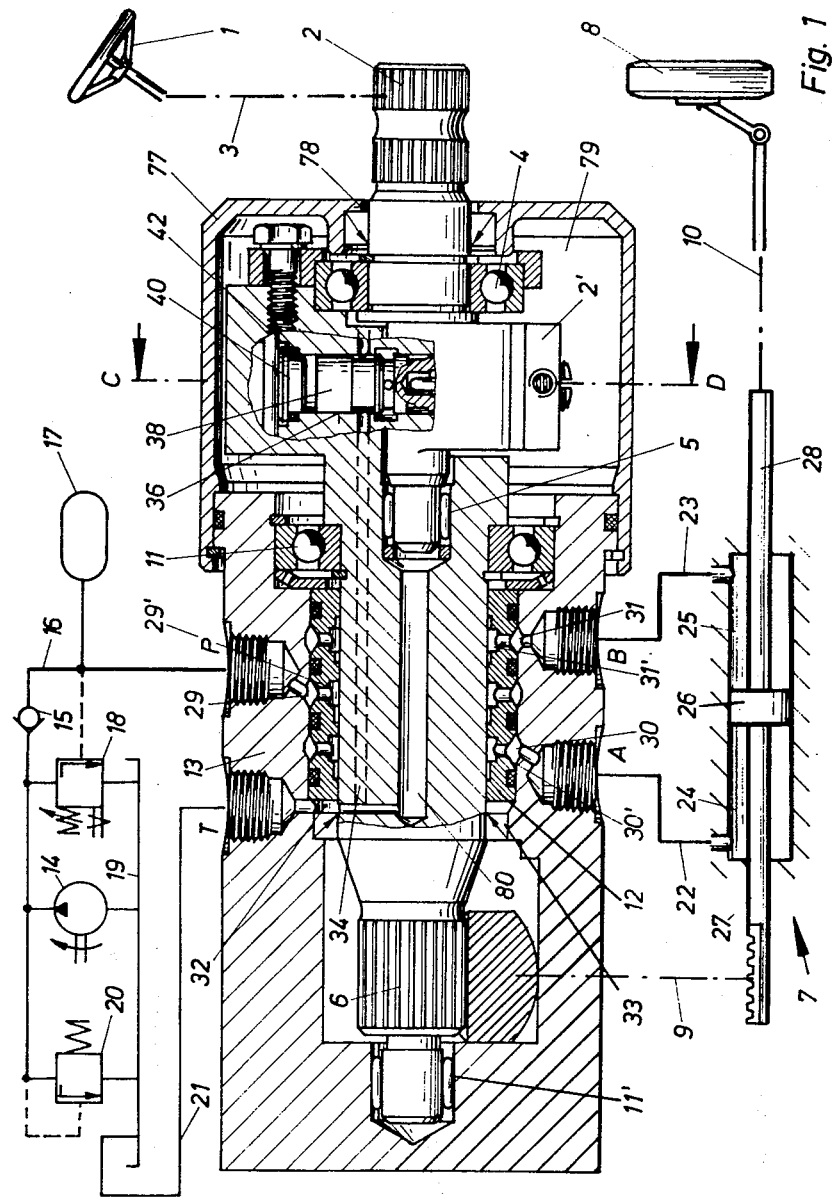
FIG. 1 is a cross-sectional view of a fluid pressure control system for the servo-assisted steering gear of a motor vehicle.
Figure 2:
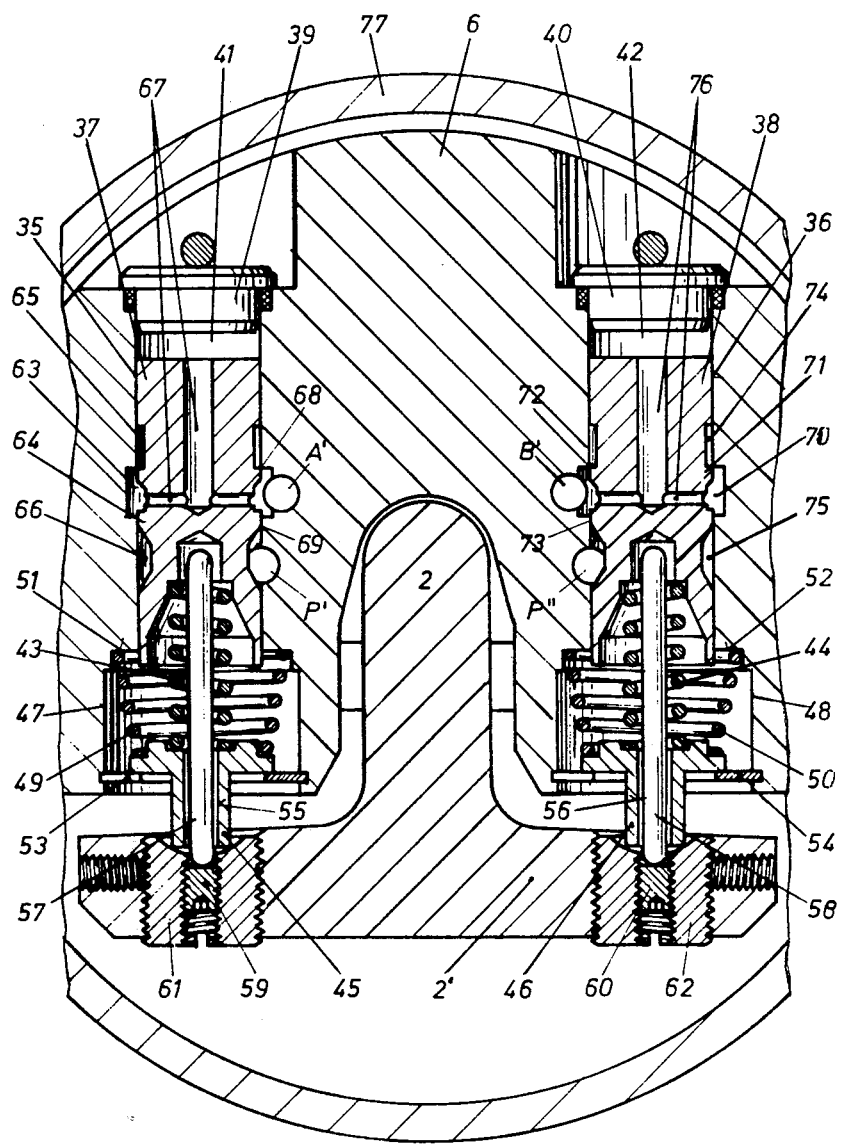
FIG. 2 is a larger scale representation of a section taken on the line C—C axially through the pressure control piston valves.

With reference to the drawing an operating means, namely, steering wheel 1 is operatively connected as indicated by a dot-dash line 3 to an input member 2. The input member 2 is mounted in two bearings 4 and 5 in an output member 6, which is operatively connected to a servo-motor 7 as well as to a movable member, namely, steered wheels 8, as indicated by dot-dash lines 9 and 10. The output member 6 is mounted in bearings 11 and 11' and associated with a floating bush 12 inside a connector body 13. The connector body 13 contains connections P, A, B and T. A pump 14 supplies pressure fluid to connection P through a pipe 16 containing a check valve 15. An accumulator 17 is also connected to pipe 16. When the accumulator 17 is charged, the pump 14 pumps the pressure fluid through an unloading valve 18 which is connected to pipe 16 upstream of the check valve 15 and controlled by the fluid pressure in pipe 16 back into a reservoir 19 in which the pressure is atmospheric. The pump 14 is further safeguarded by a pressure-limiting valve 20. From connection T a return pipe 21 likewise leads to the reservoir. Pipes 22 and 23 lead from the two connections A and B to the working chambers 24 and 25 of a double-acting servo-motor 7. The working chambers 24 and 25 have like hydraulic cross sections, being separated by a piston 26 provided with a piston rod 27 and 28 on each side. Inside the connector body 13 the connections P, A and B communicate with annular grooves 29, 30 and 31 in the outside periphery of bush 12, each groove in turn communicating through a transverse duct with a corresponding annular groove 29', 30' and 31' in the interior of bush 12. Transverse and longitudinal channels, not shown, inside the output torque member 6 end in these annular grooves. They lead to valve members which will be later described. Connection T communicates with an annular chamber 32 between a seal 33 and the end face of the bush 12. A channel 34 extends from this annular chamber inside the output torque member 6. As will be understood by reference to FIG. 2 the output member 6 contains transverse bores 35 and 36 on each side of its center axis and these slidably contain control pistons 37 and 38. The ends of the bores 35 and 36 are tightly closed by sealing plugs 39 and 40. The spaces between the sealing plugs 39 and 40 and the control pistons 37 and 38 will be hereinafter referred to as reaction chambers 41 and 42. The ends of the control pistons 27 and 38 remote from these reaction chambers 41 and 42 are loaded by coil biasing springs 43 and 44 which are supported by spring retainers 45, 46. The ends of the bores 35 and 36 are enlarged to form bores 47 and 48 containing further coil springs 49 and 50 which are also supported by the spring retainers 45, 46, whereas their other ends bear against the shoulders 51, 52 formed at the junction between the bores 35, 47 and 36, 48. The spring retainers 45, 46 may in turn bear on stop rings 53, 54 in the output member 6. The spring retainers 45, 46 have axial holes 55 and 56 which roughly correspond in diameter to the internal diameter of the coil springs 43, 44. Tappets 57, 58 project through these holes 55, 56 and the coil springs 43, 44 and make endwise contact with set screws 59, 60. These set screws 59 60 are contained in centering screws 61, 62 which are adjustably fitted in the input member 2 which is here shaped like a two-armed lever 2'. The centering screws 61, 62 cooperate with the spring retainers 45, 46. The bore 35 is provided roughly midway between its ends with an enlargement forming an annular groove 63 from which a channel A' leads in a manner not shown in detail to the annular grooves 30' and 30 and to connection A. When control piston 37 is in its neutral position the annular groove 63 faces a land 64 which separates annular grooves 65 and 66 in the control piston 37. The annular groove 65 is connected in a manner not shown to a channel corresponding to channel 34. At the level of the annular groove 66 the bore 35 is intersected by a channel P' which likewise in a manner not shown in detail communicates via the annular grooves 29' and 29 with connection P. The annular groove 63 is permanently connected by a duct 67 in the control piston 37 to the reaction chamber 41. The effective control edges of the land 64 are marked 68 and 69. Analogously the bore 36 has an enlargement forming an annular groove 70 intersected by channel B' which in turn communicates with connection B. When the control piston 38 is in neutral position the annular groove 70 faces a land 71 which forms control edges 72 and 73. The land 71 separates two annular grooves 74 and 75. A channel P'' leads from annular groove 75 to connection P. Channel 34 communicates with annular groove 74. The annular groove 70 is permanently connected by a duct 76 to the reaction chamber 42. That part of the output member 6 which contains the control pistons 37 and 38 is enclosed within a cup-shaped cover 77 which is connected by a fluid-tight joint to the fixed connector body 13, and which contains an entry opening 78 for the fluid-tight passage therethrough of the input member 2. A space 79 which remains between the cover 77, the input member 2 respectively the output member 6 and the connector body 13 is at atmospheric pressure since it communicates through a channel 80 inside the output member 6 and the annular chamber 32 with the exhaust connection T.

For an explanation of the manner in which the described system functions let it be assumed that there is no pressure as yet at connection P and that no torques are applied either to the steering wheel 1 or to the steered wheels 8. Under these conditions the control pistons 37 and 38 will be urged by their biasing springs 43 and 44 against the sealing plugs 39 and 40, thus reducing the reaction chambers 41 and 42 to a minimum size. Now the pump 14 begins to generate pressure and to force fluid through connection P into channels P' and P''. Since the control edges 69 and 73 afford passage from P' to A' and from P'' to B' the pressure fluid will flow through the two connections A and B into the working chambers 24 and 25. At the same time pressure fluid will also flow through ducts 67 and 76 into the reaction chambers 41 and 42. As soon as the pressure rise is sufficient to overcome the thrusts of the biasing springs 43 and 44 the control pistons 37 and 38 will shift and compress the biasing springs 43 and 44. The pistons will thus progressively cut off the connections from P' to A' and from P'' to B' until they are blocked altogether. In the resultant position which is referred to as the neutral position of the control pistons 37 and 38 a predetermined basic minimum pressure will have been established in the reaction chambers 41 and 42 as well as in the working chambers 24 and 25. This minimum pressure corresponds to the biasing thrusts of the biasing springs 43 and 44. For the further continuation of this explanation let it now be assumed that the steering wheel 1 and hence the input member are turned clockwise. So long as the resistance offered by the wheels 8 to deflection is low and remains below a given threshold of response the events which now take place will be as follows:

The input member 2 and its lever 2' will apply thrust by means of the centering screw 61 to the spring retainer 45. However, since both the coil spring 49 and the biasing spring 43 are precompressed, resistance will be offered to the lifting of the spring retainer 45 from its stop ring 53. Consequently, the thrust applied to the centering screw 61 will be transmitted on the one hand by coil spring 49 and on the other hand by biasing spring 43, the control piston 37 and the cushion of pressure fluid in reaction chamber 41 to the output member 6. So long as the bias of the precompressed springs 49 and 43 is not overcome, the output member 6 will therefore participate exactly in the movements of the input member 2 without the occurrence of relative movement between them. The deflection will be transmitted to the steered wheels 8, respectively, to the servo piston 26 without hydraulic assistance. The servo-piston 26 may move to the right displacing pressure fluid from chamber 25. This displacement of fluid causes a slight pressure rise which is transmitted via connection B and channel B' and then through duct 76 into the reaction chamber 42. The corresponding slight pressure rise in this chamber causes the control piston 38 to be shifted and thus slightly further to compress biasing spring 44 until the control edge 72 opens a passage from annular groove 70 to annular groove 74 or, expressed in other words, establishes communication between working chamber 25 and exhaust. Since very small shifts of the control piston 38 will already establish this connection, the actual pressure rise will in fact remain very slight. The tappet 58 will not therefore at this stage come into contact with the control piston 38. On the other hand, the displacement of the servo-piston 26 also produces a pressure drop in working chamber 24 and hence a like pressure drop in the associated reaction chamber 41. This pressure drop enables the biasing spring 43 to move the other control piston 37 into a piston in which the control edge 69 opens a connection from P' to A'. The pressure fluid can therefore refill the enlarged volume of working chamber 24. However, this replenishment of the working chamber does not provide power-assistance because the pressure of the entering pressure fluid does not exceed the previous minimum pressure level. A similar automatic shift of the control pistons 37 and 38 takes place when the servo-piston 26 is mechanically displaced by the steered wheels 8, as will be the case for instance when these automatically return into their straight-ahead positions after steering action. If it is now assumed that the torque applied by the input member continues to rise, then the thrusts of the biasing spring 43 and the coil spring 49 will be overcome. At this point the servo system begins to respond because the spring retainer 45 will be lifted off its stop 53, causing the biasing spring 43 to be further compressed and the control piston 37 to be shifted into a position in which communication between P' and A' is more widely opened. The pressure in the reaction chamber 41 therefore now rises in proportion to the increased thrust of biasing spring 43 so that in effect the pressure in working chamber 24 will likewise rise to displace the servo-piston 26 and thereby to provide true servo-assistance. Naturally, a proportion of the thrust corresponding to the bias of the biasing spring 43 and the coil spring 49 will be directly mechanically transmitted without being reinforced. It should be noted that the control piston 37 will remain substantially near its neutral position. The relative movement between input member 2 and control piston 37 results in the tappet 57 being advanced towards the latter until eventually mechanical contact is established between the two. From this instant onwards the control valve will behave like a conventional control valve. Throughout the described sequence of events the control piston 38 will operate in the same way as already described. If the steering wheel is turned in the counterclockwise direction the same sequence of events will occur, excepting that the functions of the control pistons will be reversed. It is possible with the aid of the centuring screws 61 and 62 to adjust the lever 2' so that its position is symmetrical with respect to the output member 6. Moreover, the set screws 56 and 60 permit a direct clearance to be preset between the tappets 57 and 58 and the control pistons 37 and 38. This clearance must be at least sufficient for the control piston to allow pressure fluid to escape at a rate avoiding a significant pressure rise. It should also be mentioned that the spring retainer of the control piston controlling the escape of the pressure fluid loses contact with its associated centering screw when the response threshold has been reached, so that the springs associated with this piston do not in any way influence the level of the response threshold or the behaviour of the control piston controlling the entry of pressure fluid.

The invention is not limited in scope to the above described illustrative embodiment. More particularly, diverse modifications are feasible with regard to the shape and disposition of the control pistons. For instance, it would be quite possible to arrange the pistons in axial alignment and to displace them by means of a common cam located between them. Furthermore, the described control valve arrangement could be integrated in block type steering gear. Although the servo-motor in the illustrated embodiment is shown to have equal hydraulic cross sections, the invention could naturally also be applied to servo-motors having unequal hydraulic cross sections. In such a case the cross sections of the reaction chambers would be designed to agree with the rate of the hydraulic cross sections of the servo-motor.

What is claimed is:

1. A hydraulic pressure fluid control system for controlling the displacements of a double-acting servo-motor comprising:
   a servo-motor having a two-faced servo piston, a motor body enclosing said servo piston and thereby defining two working chambers, and a working member operatively associated with said servo piston;
   a hydraulic pressure fluid source having a suction and a discharge;
   a hydraulic pressure fluid return reservoir connected to said suction;
   an input member;
   an operating means attached to said input member for operating said input member;
   an output member, said output member operatively associated mechanically with said working member;
   a movable member operatively connected to said working member;
   an interconnecting means for connecting said input member and said output member operatively interposed therebetween, said interconnecting means comprising a mechanical operating means for directly linking said input member and said output member and
   a servo assisting valving means for controlling said servo motor, said servo assisting valving means comprising two valve chambers, each associated with one of said working chambers of said servo motor;
   two control pistons each displacably contained within one of said valve chambers, said control pistons each having a reaction face to which is applied the pressure from the respective working chamber and a coil spring opposing the thrust of the pressure acting on said reaction face, said coil springs causing a predetermined minimum pressure to act on said reaction face and to be maintained in said working chambers, and an actuating means for mechanically operating said control pistons in dependance on the relative motion between said input member and said output member, said actuating means having a rigid coupling connection and a biased elastically yielding coupling which includes said coil springs, said control pistons being arranged so that in a neutral position said working chambers are disconnected from said pressure source and said return reservoir, and when starting from said neutral position said rigid coupling connection being achieved after a predetermined relative motion has occurred between said input member and said output member; and
   conduit means for conveying pressure fluid from said pressure source discharge to each valve chamber, further conduit means for conveying pressure fluid between each valve chamber and its respective working chamber and still further conduit means for conveying pressure fluid from each valve chamber to said return reservoir;
   the improvement comprising said actuating means further including two spring retainers interposed between said coil springs and said output member and two further coil springs biasing said spring retainers and being arranged concentrically and acting codirectionally with said first-mentioned coil springs and being engaged between said output member and said spring retainers; said spring retainers being arranged to be moved by said input member to further compress said coil springs and said further coil springs when the thrust of said input member exceeds a response threshold established by the bias of said coil springs and said further coil springs.

2. The hydraulic pressure fluid control system as claimed in claim 1, wherein said operating means comprises the steering wheel of a motor vehicle and said movable element comprises the steerable wheels of said motor vehicle.

* * * * *